Patented Aug. 18, 1931

1,819,961

UNITED STATES PATENT OFFICE

BERTRAM MAYER, OF BASEL, AND JOSEPH GRIMMER, OF NEUEWELT, NEAR BASEL, SWITZERLAND, ASSIGNORS TO SOCIETY OF CHEMICAL INDUSTRY IN BASLE, OF BASEL, SWITZERLAND

AZO DYESTUFFS AND PROCESS OF MAKING SAME

No Drawing. Application filed October 11, 1928, Serial No. 311,960, and in Switzerland October 31, 1927.

The present invention relates to the manufacture of azo-dyestuffs. It comprises the process of making the new dyestuffs, the dyestuffs themselves, and the material that has been dyed with the new products.

It has been found that direct-dyeing cotton dyestuffs are obtained, which are particularly valuable for the production of tints fast to light, by coupling a diazo-compound with an aromatic primary amine coupling in 4-position to its amino-group, further diazotizing the monoazo dyestuff thus obtained, again coupling with an aromatic primary amine coupling in 4-position to its amino-group, then diazotizing the disazo-dyestuff thus produced of the general formula $R_1-N=N-R_2-N=N-R_3-NH_2$, wherein $R_1$, $R_2$ and $R_3$ have the significations hereinafter given, and coupling in acid, neutral or alkaline medium with 1-amino-5-hydroxynaphthalene-7-sulfonic acid.

The dyestuffs thus made are dark powders, corresponding with the general formula $$R_1-N=N-R_2-N=N-R_3-N=N-R_4$$

wherein $R_1$, $R_2$ and $R_3$ signify benzene or naphthalene nuclei which contain no free hydroxy-groups and of which at least two contain sulfo-groups, and $R_4$ means the residue of 1-amino-5-hydroxynaphthalene-7-sulfonic acid. They dissolve in water containing sodium carbonate and in concentrated sulfuric acid to blue grey to green grey solutions and dye cotton in neutral or feebly alkaline baths very uniform grey to blue grey and green grey tints of good fastness to light. This is also the case with the dyestuffs in which the end component has been coupled in a medium the pH of which lies between 1.5 and 8.4. Such a medium contains inter alia alkali bicarbonate or an alkali acetate or phosphate as an acid binding agent.

The following examples illustrate the invention, the parts being by weight:—

Example 1

9.3 parts of aniline are diazotized as usual and coupled with 22.3 parts of Clève's acid. The monoazo-dyestuff is diazotized in known manner by means of nitrite and hydrochloric acid and the diazo-compound thus produced is coupled with 22.3 parts of Clève's acid. When coupling is complete the disazo-dyestuff is salted out with common salt and filtered. After suspending the filter cake in water there is added the necessary quantity of hydrochloric acid and the mixture is diazotized in usual manner by adding the calculated quantity of nitrite at 0° C. As soon as the diazotization is complete, the diazo-compound is run, while stirring, into a solution, alkaline with sodium carbonate, of 24 parts of 1-amino-5-hydroxynaphthalene-7-sulfonic acid. The combination is at once finished and the trisazo-dyestuff is salted out, filtered and dried.

The product, corresponding very probably with the formula

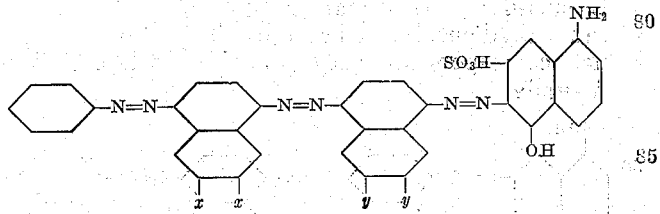

wherein the one of the $x$'s and the one of the $y$'s stands for a hydrogen atom and the other $x$ and the other $y$ for an $SO_3H$ group, is a black powder which dissolves in water, containing sodium carbonate, to a green grey solution. The solution in concentrated sulfuric acid is greenish blue grey. The product dyes cotton green grey. Similar products are obtained when for the aniline is substituted a toluidine or a sulfonic acid of aniline or of toluidine or para-aminoacetanilide, and for the Clève-acid α-naphthylamine or cresidine. As initial component may also be named:—a para-nitraniline-sulfonic acid, an acetylphenylenediaminesulfonic acid, a para-amino-phenyloxamic acid and the corresponding compounds of the naphthalene series.

Example 2

34.8 parts of sodium 2-naphthylamine-4:8-disulfonate are diazotized in the usual manner by means of sodium nitrite and hydrochloric acid and coupled with 14.5 parts of α-naphthylamine. The dyestuff produced is isolated, further diazotized and coupled with 22.3 parts of Clève-acid. After complete combination the disazo-dyestuff is further diazotized and then the diazo-compound is added to a solution of 24 parts of 1-amino-5-hydroxynaphthalene-7-sulfonic acid which has been converted into sodium salt by alkali and mixed with so much sodium acetate that the reaction is acid to litmus after the addition of the diazo-compound. The coupling is complete in a short time. The trisazo-dyestuff is changed into its sodium salt, salted out, filtered and dried. The product, corresponding very probably with the formula

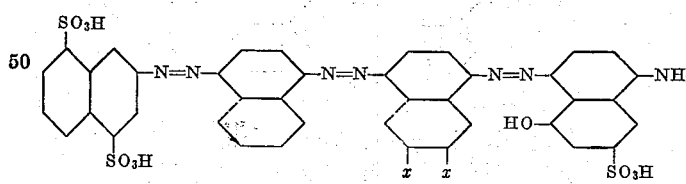

in which the one of the $x$'s stands for a hydrogen atom and the other for an $SO_3H$ group, is a black powder which dissolves in water, on addition of sodium carbonate, to a greenish blue grey solution. In concentrated sulfuric acid the product dissolves to a greenish blue grey solution. Cotton is dyed green grey and the dyeing may be further diazotized.

In this case also there may be substituted for the 2-napthylamine-4:8-disulfonic acid another initial component of the naphthalene series, such as α- or β-naphthylamine or a sulfonic acid thereof, and for the middle components named others may be substituted, care being taken that the dyestuff produced shall contain a sufficient number of sulfo-groups.

The following table shows the properties of a further number of dyestuffs obtainable in accordance with this invention:—

| 1st component | 2nd component | 3rd component | 4th component | Color of the powder | Color of the solution alkaline with sodium carbonate | Color of the solution in concentrated $H_2SO_4$ | Color of dyeing on cotton |
|---|---|---|---|---|---|---|---|
| Metanilic acid | Clève-acid | Clève-acid | 1-amino-5-hydroxynaphthalene-7-sulfonic acid (alkaline) | black | blue grey | greenish blue grey | pure grey |
| " " | " " | " " | " " (acid) | black | greenish blue grey | greenish blue grey | greenish grey |
| 2-aminonaphthalene-4:8-disulfonic acid | α-naphthylamine | " " | " " (alkaline) | black | blue grey | greenish blue grey | pure blue grey |
| " " | " " | " " | " " (acid) | black | greenish blue grey | greenish blue grey | green grey |
| Aniline | Clève-acid | " " | " " (alkaline) | black | green grey | greenish blue grey | green grey |
| " | " " | " " | " " (acid) | black | greenish blue grey | greenish blue grey | green grey |
| Metanilic acid | α-naphthylamine | " " | " " (alkaline) | black | blue grey | green grey | pure grey |
| " " | " " | " " | " " (acid) | black | blue grey | greenish blue grey | green grey |
| Clève-acid | Clève-acid | " " | " " (alkaline) | black | blue grey | greenish blue grey | pure blue grey |
| " " | " " | " " | " " (acid) | black | greenish blue grey | greenish blue grey | green grey |

What we claim is:—

1. The manufacture of direct-dyeing cotton dyestuffs by diazotizing a disazo-dyestuff of the general formula

in which $R_1$, $R_2$ and $R_3$ signify benzene or naphthalene nuclei which contain no hydroxy-groups, and of which at least two contain sulfo-groups, and coupling the diazo-compound thus formed with the 1-amino-5-hydroxynaphthalene-7-sulfonic acid.

2. The manufacture of direct-dyeing cotton dyestuffs by diazotizing a disazo-dyestuff of the general formula

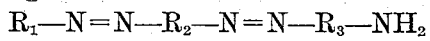

in which $R_1$, $R_2$ and $R_3$ signify benzene or naphthalene nuclei which contain no hydroxy groups and in which $R_1$ and $R_3$ contain at least one sulfo-group, and coupling the diazo-compound thus formed with the 1-amino-5-hydroxynaphthalene-7-sulfonic acid.

3. The manufacture of direct-dyeing cotton dyestuffs by diazotizing a disazo-dyestuff of the general formula

in which $R_1$, $R_2$ and $R_3$ signify naphthalene nuclei which contain no hydroxy-groups, and in which $R_1$ and $R_3$ contain at least one sulfo-group, and coupling the diazo-compound thus formed with the 1-amino-5-hydroxynaphthalene-7-sulfonic acid in such a medium the pH of which lies between 1.5 and 8.4.

4. As new products the azo-dyestuffs of the general formula $$R_1-N=N-R_2-N=N-R_3-N=N-R_4$$

wherein $R_1$, $R_2$ and $R_3$ signify benzene or naphthalene nuclei which contain no free hydroxy-groups and of which at least two contain sulfo-groups, and $R_4$ means the residue of 1-amino-5-hydroxynaphthalene-7-sulfonic acid, which products form dark powders, dissolving in water containing sodium carbonate and in concentrated sulfuric acid to blue-grey to green-grey solutions, and dyeing cotton in neutral or feebly alkaline baths very uniform grey to blue-grey and green-grey tints of good fastness to light.

5. As new products the azo-dyestuffs of the general formula $$R_1-N=N-R_2-N=N-R_3-N=N-R_4$$

wherein $R_1$, $R_2$ and $R_3$ signify benzene or naphthalene nuclei which contain no hydroxy-group, $R_1$ and $R_3$ containing at least one sulfo-group, and wherein $R_4$ signifies the residue of 1-amino-5-hydroxynaphthalene-7-sulfonic acid, which products form dark powders, dissolving in water containing sodium carbonate and in concentrated sulfuric acid to blue-grey to green-grey solutions, and dyeing cotton in neutral or feebly alkaline baths very uniform grey to blue-grey and green-grey tints of good fastness to light.

6. As new products the azo-dyestuffs of the general formula $$R_1-N=N-R_2-N=N-R_3-N=N-R_4$$

wherein $R_1$, $R_2$ and $R_3$ signify benzene or naphthalene nuclei which contain no hydroxy-group, $R_1$ and $R_3$ containing at least one sulfo-group, and wherein $R_4$ signifies the residue of 1-amino-5-hydroxynaphthalene-7-sulfonic acid which is linked with the azo-group in position 4, which products form dark powders, dissolving in water containing sodium carbonate and in concentrated sulfuric acid to blue-grey to green-grey solutions, and dyeing cotton in neutral or feebly alkaline baths very uniform grey to blue-grey and green-grey tints of good fastness to light.

In witness whereof we have hereunto signed our names this 29th day of September, 1928.

BERTRAM MAYER.
JOSEPH GRIMMER.